US008306172B2

(12) United States Patent
Kelleher et al.

(10) Patent No.: US 8,306,172 B2
(45) Date of Patent: Nov. 6, 2012

(54) ELECTRONIC DEVICE, INTEGRATED CIRCUIT AND METHOD THEREFOR

(75) Inventors: Paul Kelleher, Cork (IE); Diarmuid McSwiney, Ballincollig (IE); Conor O'Keeffe, Cork (IE); Emilio Quiroga, Lake Worth, FL (US); Samir Soni, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 494 days.

(21) Appl. No.: 12/522,043

(22) PCT Filed: Jan. 9, 2007

(86) PCT No.: PCT/EP2007/050186
§ 371 (c)(1),
(2), (4) Date: Jul. 2, 2009

(87) PCT Pub. No.: WO2008/083849
PCT Pub. Date: Jul. 17, 2008

(65) Prior Publication Data
US 2010/0111154 A1 May 6, 2010

(51) Int. Cl.
*H04L 7/00* (2006.01)
(52) U.S. Cl. ..................................................... 375/355
(58) Field of Classification Search .................. 375/215, 375/226, 244, 259, 316, 354, 355, 371, 376; 327/231, 264, 276, 277
See application file for complete search history.

(56) References Cited

U.S. PATENT DOCUMENTS

| 4,756,011 | A | 7/1988 | Cordell |
| 5,471,655 | A | 11/1995 | Kivari |
| 5,533,066 | A | 7/1996 | Yamaguchi et al. |
| 5,689,530 | A | 11/1997 | Honaker, Jr. |
| 5,699,389 | A | 12/1997 | Beladi et al. |
| 5,950,120 | A | 9/1999 | Gardner et al. |
| 6,850,580 | B1 | 2/2005 | Naoe |
| 7,466,787 | B1 | 12/2008 | Ross |
| 2002/0075972 | A1* | 6/2002 | Richards et al. .............. 375/324 |

(Continued)

FOREIGN PATENT DOCUMENTS

EP 0656693 A2 6/1995
(Continued)

OTHER PUBLICATIONS

International Search Report for PCT Application No. PCT/EP2007/050186 issued Jun. 18, 2007.

(Continued)

*Primary Examiner* — Syed Haider

(57) ABSTRACT

A wireless communication device comprises a number of sub-systems and clock generation logic arranged to generate at least one clock signal to be applied to the number of sub-systems. One of the number of sub-systems comprises sampling logic for receiving input data and performing initial sampling on an input data bit using multiple separated phases of a clock period of the at least one clock signal applied to the sampling logic thereby producing multiple phase separated sampled outputs of the input data bit. The sampling logic is configured to perform a number of re-sampling operations on the multiple phase separated sampled outputs at a number of intermediate phases thereby producing multiple phase separated intermediate sampled outputs prior to performing a final sample of the multiple phase separated intermediate sampled outputs at a single phase of the at least one clock signal to produce a sampled input data signal.

18 Claims, 6 Drawing Sheets

U.S. PATENT DOCUMENTS

2005/0163262 A1 7/2005 Gupta
2008/0051057 A1 2/2008 Bliss
2008/0292038 A1* 11/2008 Ide .............................. 375/355

FOREIGN PATENT DOCUMENTS

| | | |
|---|---|---|
| EP | 1009125 A | 6/2000 |
| WO | 2008083850 A1 | 7/2008 |
| WO | 2008083856 A1 | 7/2008 |

OTHER PUBLICATIONS

International Search Report for PCT Application No. PCT/EP2007/050188 issued Sep. 19, 2007.

Balamurugan et al; "8-Gb/s Source-Synchronous I/O Link Adaptive Receiver Equalization, Offset Cancellation, and Clock De-Skew"; IEEE Journal of Solid-State Circuits, 2005, pp. 80-88.

Fogg; "DigRF Baseband/RF Digital Interface Specification"; 2004, www.digrf.com.

International Search Report for PCT Application No. PCT/EP07/50268 issued Jun. 12, 2007.

Non-Final Office Action mailed Apr. 30, 2012 for U.S. Appl. No. 12/522,047, 21 pages.

Non-Final Office Action mailed Mar. 30, 2012 for U.S. Appl. No. 12/522,045, 18 pages.

* cited by examiner

Delay – How many bit periods it took to make the decision on the correct clock phase and data path selection. It determines how far along the data pipe the incoming data has preceded.

ELECTRONIC DEVICE, INTEGRATED CIRCUIT AND METHOD THEREFOR

FIELD OF THE INVENTION

This invention relates to an electronic device, an integrated circuit and method of sampling data therefor. The invention is applicable to, but not limited to, a multimode wireless communication device and method for sampling data therein.

BACKGROUND OF THE INVENTION

Wireless communication devices, such as mobile phone handsets, require a very high level of integration of hardware and firmware/software in order to achieve the necessary density of functionality, i.e. to realise the necessary functionality in a minimum device volume and at a minimum cost. An optimal wireless communication device design must also minimise power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems comprise radio frequency power amplification functions, radio frequency integrated circuits (RFIC) comprising radio frequency generation, amplification, filtering logic, etc. as well as baseband integrated circuits (BBIC) comprising audio circuits, encoding/decoding, (de)modulation functions, processing logic, etc. and memory units.

Interfaces, which are often standardised to allow commonality and increased functionality between different chip-set manufacturers and different handset manufacturers, are defined for communicating between the respective sub-systems.

In the field of mobile phones, a consortium of mobile phone manufacturers has been formed to define various sub-system interfaces, particularly interfaces for variants of the second generation (2x.G), third generation (3G) and fourth generation (4G) of cellular phones comprising communication technologies such as multimode transceivers additionally employing different access technologies such as wideband code division multiple access (WCDMA). This consortium is known as 'DigRF' and details of the defined interfaces and functionality thereof, particularly in a multimode mobile phone scenario, can be found on their web-site at www.digrf.com. One interface being defined by the DigRF consortium is the Dual-Mode 2.5G and 3G interface baseband (BB)-radio frequency (RF) interface standard, which encompasses a serial interface for Control, Receive (Rx) and Transmit (Tx) variants of cellular phones chipsets. The Dual-Mode 2.5G and 3G interface is implemented using differential voltage pairs for data transfers.

Within 3G DigRF, the transmit data is referred to as 'TxData' in the direction from the BBIC to the RFIC and the receive data is referred to as 'RxData' routed in the direction from the RFIC to the BBIC. The RFIC-BBIC interface supports the following data rates:

(i) TxData: Low speed at SysClk/4 and High speed at 312 Mbps, and
(ii) RxData: Low speed at SysClk/4 and SysClk, and High speed at 312 Mbps, where SysClk (i.e. the system clock) may operate at 19.2 MHz, 26 MHz or 38.4 MHz.

Data transmission between the baseband (BB) line drive and RF line receiver is asynchronous in nature. Consequently, the uplink controller does not have the knowledge about the correct clock phase to be used for extracting the data. Thus, a synchronization pattern is transmitted close to the start of a frame to facilitate synchronization, and cross-correlation algorithms are used to determine the best clock phase for extraction of data. As a result, synchronization and cross-correlation activities are key functions of the interface.

The receiving end of the Dual-Mode 2.5G and 3G interface is required to provide a means of adjusting the sample phase of the selected clock speed (which may be running at 1248 MHz or 2496 MHz for high speed) so as to centre the sampling point in the centre the data bit period, as understood by those skilled in the art, and hence ensure reliable communication. The Dual-Mode 2.5G and 3G interface Standard suggests the use of eight nominally equally-spaced 312 MHz sample phases (in practice approximately 45 degrees separated) each within a bit period for high speed data rates. The Dual-Mode 2.5G and 3G interface standard also proposes a low power mode whereby every other phase is skipped in the sampling logic, thereby allowing the receiver to operate using only four phase samples for high and low speed data rates. For low data rates (SysClk/4) 4 equally spaced samples phases (SysClk) can be used.

There are a number of known methods that may be used to sample the low or high speed data arriving on the Dual-Mode 2.5G and 3G interface. For example, over-sampling the data with a higher clock speed and/or over-sampling the data with a number of clock phases may be used. These over-sampling techniques are known to require very fast clock rates, whereby many functions significantly affect the fine margins in ensuring the correct clock signal is applied to the correct logic element at the correct time instant. For example, if over-sampling is applied to the eight nominally equally-spaced 312 MHz sample phases, the transition time between sampling phase '7' and phase '0' are adversely affected by, say, propagation factors of an integrated circuit layout, clock jitter, a number of logic components in the clock generation and routing path, etc. In such a situation, it is very difficult to ensure correct operation of sample and hold circuits, such as flip-flops, registers, etc., that is to ensure the correct data signal is input to the sample and hold circuit when the correct clock phase trigger is applied, particularly when high speed data is to be supported.

In general, when designing integrated circuits to support communications across an interface, a digital circuit designer has to take into account many factors that affect the performance of the manufactured integrated circuit. For example, known limitations with digital circuit design further encompass accommodating sampling techniques to operate across multiple data rates and clock rates (or clock phases being used), thereby increasing the complexity of the clock tree design.

Thus, it is often advantageous to reduce the clock tree complexity, namely the generation and propagation of respective clock signals as they are divided/multiplied from a clock source and routed around the digital circuits.

A need therefore exists for an improved electronic device and method to sample data, particularly in the context of a Dual-Mode 2.5G and 3G interface wireless communication device and integrated circuit therefor, without incurring increased cost, power, silicon area or complexity.

SUMMARY OF INVENTION

In accordance with aspects of the present invention, there is provided a data and control interface, an electronic device and an integrated circuit therefor as defined in the appended Claims.

BRIEF DESCRIPTION OF THE DRAWINGS

Exemplary embodiments of the present invention will now be described, by way of example only, with reference to the accompanying drawings, in which.

DESCRIPTION OF EMBODIMENTS OF THE INVENTION

Embodiments of the invention will be described in terms of a wireless communication device, such as a multimode 3G mobile telephone. However, it will be appreciated that the invention may be embodied in any other type of electronic device, such as any wireless communication device, or even non-wireless communication device such as a computer-based device, which incorporates a data interface between respective sub-systems within the device. In the sense of a wireless application, it is envisaged that the inventive concept is applicable to any multimode wireless communication device, for example a wireless communication device supporting Bluetooth™ or ultra wideband orthogonal frequency division multiplex (UWB OFDM) technology or a multi-mode communication system combining 3G with variants of second generation (2x.G) technology or a future multimode communication system combining 3G with fourth generation (4G) technology.

In summary, the proposed technique to alleviate one or more of the aforementioned problems is to introduce an intermediate phase sampling state between an initial phase sampling operation and a final phase sampling operation. The intermediate phase sampling operation is selected carefully so that it maximises the amount of time between the initial and intermediate phases and also the time between the intermediate and final phases, for one or more data paths. In this manner, applying the inventive concept assists in ensuring correct operation of sample and hold circuits, such as flip flops, registers, etc in having the correct data signal input to the circuit when the correct clock phase trigger is applied. Furthermore, all of the data paths are arranged to have the same clock phase for the final stage. In one embodiment of the invention, the final clock phase determines the intermediate phases to be used. The final phase will determine the intermediate phases in order to maximise the time between the following:

(i) Final phase and Intermediate phases;
(ii) Initial Phases and Intermediate Phases.

By programming the final clock phase to be used for the data paths, the intermediate phases can be switched to the optimal phases to meet the timing requirements.

Figure 1:
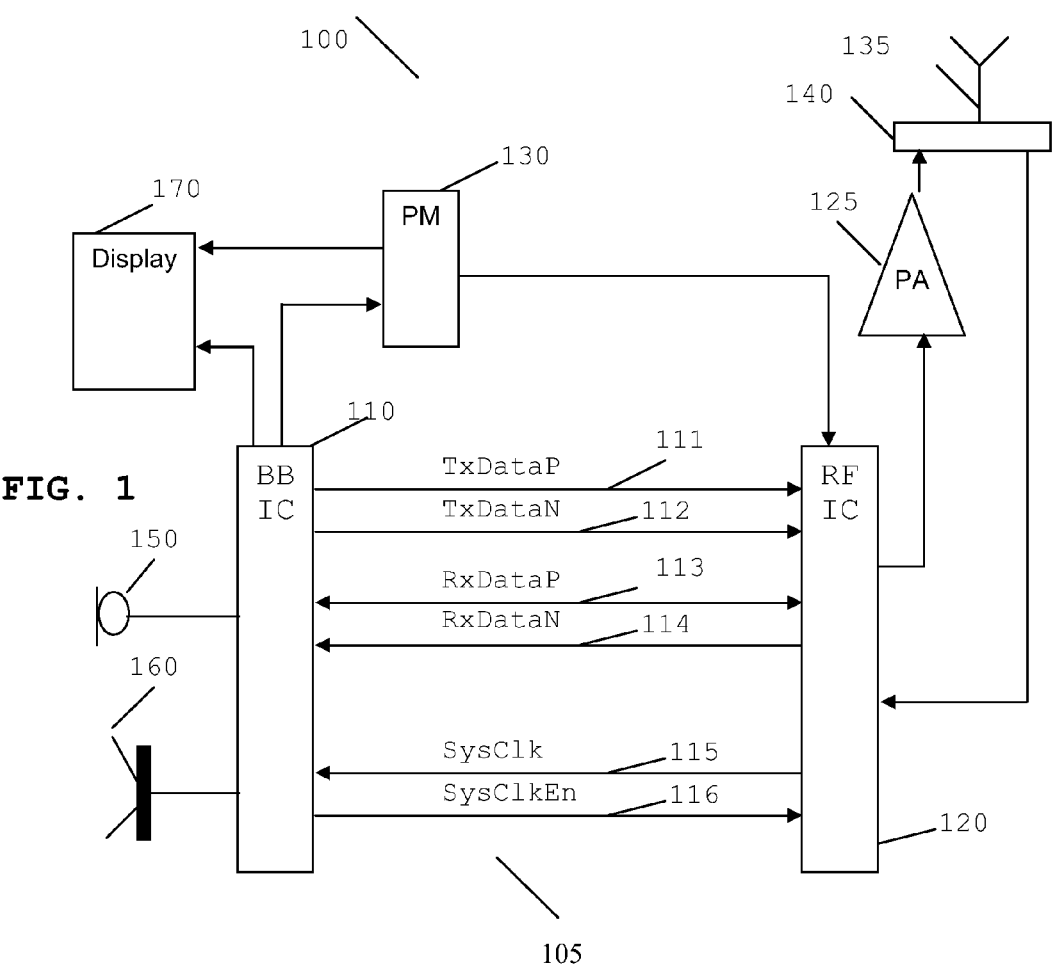
FIG. 1 illustrates a simplified block diagram of a wireless communication device, illustrating a BBIC-RFIC interface as defined by the DigRF standard, adapted in accordance with embodiments of the invention.

Referring first to FIG. 1, there is shown a simplified block diagram of part of a wireless communication device 100, adapted to support the inventive concept of embodiments of the invention. The wireless communication device 100, in the context of embodiments of the invention, is a multimode 3G mobile telephone. As such, the wireless communication device 100 contains an antenna 135, preferably coupled to a 3G duplex filter or antenna switch 140, that provides isolation between receive and transmit chains within the wireless communication device 100. The receiver chain, as known in the art, includes numerous receiver circuitries, such as receiver front-end circuitry effectively providing reception, filtering and intermediate or base-band frequency conversion (not shown). The receiver circuitry is preferably predominantly formed on a radio frequency integrated circuit (RFIC) 120. The RFIC 120 is preferably coupled to a number of other elements/functions (not shown) such as signal processing logic, memory elements, etc.

As known in the art, the RFIC 120 is operably coupled to a baseband IC (BBIC) 110 that performs a number of signal processing operations at baseband frequencies, such as decoding/encoding, (de)modulation, (de-)interleaving functions and the like. The BBIC 110 is preferably coupled to a number of other elements/functions (not shown), such as signal processing logic, memory elements, etc. The BBIC 110 preferably comprises a timer or clock function (not shown), or is operably coupled to an external timer or clock, to control the timing of operations (transmission or reception of time-dependent signals) within the wireless communication device 100.

The coupling between the RFIC 120 and the BBIC 110 is preferably implemented via a RFIC-BBIC data interface 105, which comprises six pins to carry electrical signals there between. The six pins preferably comprise a differential TX path (TxDataP line 111, TxDataN line 112), differential RX path (RxDataP line 113, RxDataN line 114); single ended SysClk line 115 and a single ended SysClkEn line 116. For Diversity an additional pin called InterfaceEn is used, which is not shown in FIG. 1.

It is envisaged that the BBIC 110 may be operably coupled to a plurality of RFICs 120 (not shown), where each additional RFIC has an InterfaceEn line 118. The BBIC is also preferably coupled to one or more output devices, such as audio speaker 160 and/or display 170.

As regards the transmit chain of the wireless communication device 100, this includes an input device, such as a microphone 150 and/or keypad (not shown), coupled to the BBIC 110. The RFIC in a transmit function is coupled to a radio frequency power amplifier 125 and thereafter to the antenna 135 via the antenna switch or duplex filter 140. A voltage regulator (not shown) associated with the RFIC 120 is preferably part of a power management unit 130, with the BBIC 110 maintaining control of the power management unit 130.

In accordance with embodiments of the invention, the BBIC-RFIC interface, and therefore the BBIC and RFIC devices, have been adapted to function using an improved data sampling logic, as described below with respect to FIG. 2, FIG. 3 and FIG. 4, and cross-correlation logic, as described with respect to FIG. 5 and FIG. 6.

In signal processing, the cross-correlation (or sometimes "cross-covariance") is a measure of similarity of two signals, commonly used to find features in an unknown signal by comparing it to a known one. It is a function of the relative time between the signals The Dual-Mode 2.5G and 3G interface standard has a 16-bit synchronisation pattern at the start of each frame. The Cross-Correlator searches the incoming data stream that it receives from the Line Receiver in order to detect the defined 16 synchronisation pattern. The number of matches required in order indicate a synchronisation pattern has been detected can be programmable.

The transfer of data across the interface is asynchronous. Therefore, the clocks phases on the transmitting end of the interface can be asynchronous to the clock phases on the receiving side. Therefore Phase '0' on the transmitting side may be Phase '5' on the receiving side of the interface.

Figure 2:
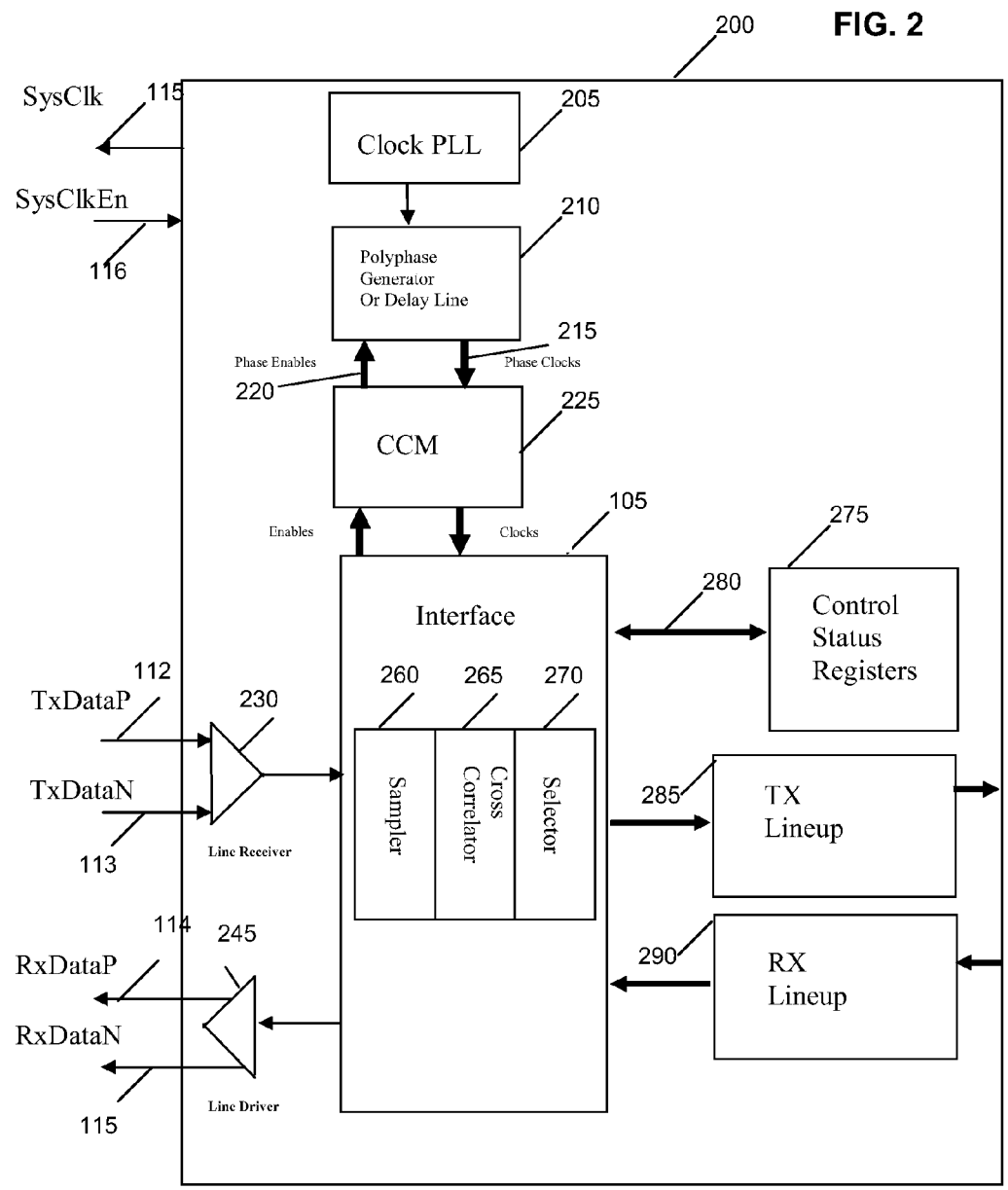
FIG. 2 illustrates a block diagram of a data sampling circuit of a wireless communication device, in accordance with embodiments of the invention.

Referring now to FIG. 2, a block diagram of a data sampling circuit 200 of a wireless communication device is illustrated in accordance with embodiments of the invention. The data sampling circuit 200 comprises receiving a System Clock Enable (SysClkEn) signal 116 from a System Clock (SysClk) output signal 115 which can also be connected to other digital components in the wireless communication device 200. The data sampling circuit 200 comprises, or is operably coupled to in other embodiments, a clock generation circuit, for example one comprising a clock phase locked loop (PLL) 205 operably coupled to a polyphase generator or Delay Line Circuit 210 that is arranged to generate a plurality of phases of a single clock signal, for example generating eight respective, substantially equi-separated phase delayed signals of a primary clock signal.

The polyphase generator or Delay Line Circuit 210 is operably coupled to a clock control module 225, for receiving the respective plurality of phases of a single clock signal 215 from the polyphase generator 210 and providing phase enable signals 220 thereto, to enable or disable respective phases of the clock signal output from the polyphase generator or Delay Line Circuit 210.

The clock control module (CCM) 225 is operably coupled to the interface, for example a BBIC-RFIC interface 105. The BBIC-RFIC interface 105 comprises sampler logic 260, cross-correlator logic 265 and selector logic 270. The sampler logic 260, cross-correlator logic 265 and selector logic 270 are further described with respect to FIG. 3 and FIG. 5. The BBIC-RFIC interface 105 receives transmit data 112, 113 via a line receiver 230 and outputs the synchronised transmit data via the wireless communication device's transmitter line-up 285. The BBIC-RFIC interface 105 receives data via a receive line-up 290, and outputs the received data via line driver 245 on differential interface signals 114, 115.

A set of control status registers 275 is operably coupled 280 to the BBIC-RFIC interface 105 for providing information on the data speed of the received data, as well as the selection of the clock phases being used in the sampling of data being passed over the BBIC-RFIC interface 105. The set of control status registers 275 contains the settings which are required for the interface 105 and the wireless communication device 200 to function correctly.

Figure 3:
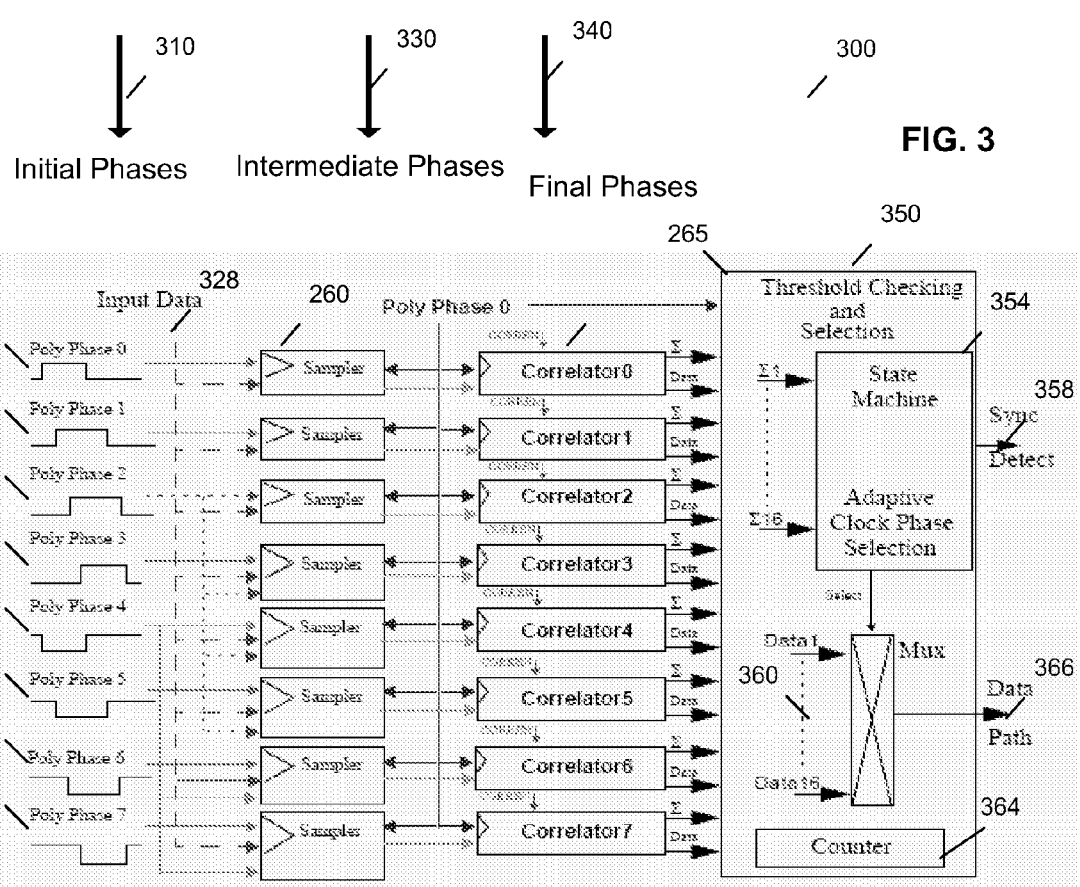
FIG. 3 illustrates a more detailed block diagram of the sampling logic used in embodiments of the invention.

Referring now to FIG. 3, a more detailed block diagram of the sampling logic used in embodiments of the invention is illustrated. The input data 328 from the Line Receiver is operably coupled to eight sampler blocks. Each sampler block samples the data path with a different clock phase from the poly-phase generator. As shown, eight nominally equi-spaced 312 MHz sample phases (approximately 45 degrees separated) 312, 314, 316, 318, 320, 322, 324 and 326 are input to a series of parallel sampling logic 260. Each sampler within the sampling logic also receives input data 328. Each sampler block, within the sampling logic 260, samples the data path with a different clock phase provided from the poly-phase generator via the CCM, and re-samples the sampled data to an intermediate phase, as shown in the Tables below.

In this embodiment each data path is labelled by the initial phase:

Datapath '0' has Phase '0' as the initial phase, followed by an intermediate and final phase.

Datapath '1' has Phase '1' as the initial phase, followed by an intermediate and final phase Datapath '2' has Phase '2' as the initial phase, followed by an intermediate and final phase Datapath '3' has Phase '3' as the initial phase, followed by an intermediate and final phase Datapath '4' has Phase '4' as the initial phase, followed by an intermediate and final phase Datapath '5' has Phase '5' as the initial phase, followed by an intermediate and final phase Datapath '6' has Phase '6' as the initial phase, followed by an intermediate and final phase.

Datapath '7' has Phase '7' as the initial phase, followed by an intermediate and final phase.

Finally, the sampling logic 260 re-samples the data from each respective intermediate phase to a single phase to be used as a reference for the remaining logic in the digital circuitry, for example re-sampling to phase '0'. The intermediate phase is used to synchronise timing between the initial phase 310 and a final phase 340. Notably, the final phase 340 is selected so that all of the clock trees after the sampling logic are clocked by the same phase of the same clock signal.

In this manner, the received data 328 from the interface is sampled with each individual phase 312, 314, 316, 318, 320, 322, 324 and 326, re-sampled a second time to an intermediate phase in sampling logic 260 and finally re-sampled to a single phase to be passed to cross-correlator logic 265. This allows the cross-correlator logic 265 to select a data path and allow the unselected data paths to be disabled, as illustrated in Table 3. This allows for easier design of the sampling process, allows the design to make timing closure at a high data and clocking rate, simplifies the clock tree design and reduces power consumption.

After cross-correlation one of these data paths will be selected as the optimum sampler of the incoming data. The data path that is selected will indicate which initial phase was used, as each data path has a different initial phase. The selected data path will be valid for the duration of the current frame, or until the next frame is detected.

One task of the cross-correlation scheme is to estimate the best clock phase for extraction of the multiple samples of the input data bit. The cross-correlation and selection of the correct clock phase is described in FIG. 5 and FIG. 6.

One embodiment for selecting intermediate phases, and thereafter selecting a subsequent final phase to be used, is illustrated in the Tables 1 to 3 below. The use of an intermediate sampling step facilitates independent sampling to support either '8' or '4' initial phases for high speed data (see Table 1 and Table 2) and supports the use of '4' initial phases to be used for low speed data (see Table 3, where the other four data paths are disabled for low speed data, thereby saving power). Thus, the same architecture can be used to support both high speed and low speed data.

Table 1 shows the initial, intermediate and final phases for high-speed '8' initial phase selection. Each of the initial phases is different. The Intermediate phases are programmed to maximise the timing between the initial and intermediate phases and between the intermediate and final phases. Only one data path will be selected, all the others will be disabled after synchronization and cross-correlation, for the duration of the frame or until the start of the next frame.

TABLE 1

High speed correlation

| DataPath | Initial Sample Phase | Intermediate Sample Phase | Final Sample Phase |
| --- | --- | --- | --- |
| 0 | Phase 0 | Phase 0 | Phase 0 |
| 1 | Phase 1 | Phase 0 | Phase 0 |
| 2 | Phase 2 | Phase 0 | Phase 0 |
| 3 | Phase 3 | Phase 0 | Phase 0 |
| 4 | Phase 4 | Phase 2 | Phase 0 |
| 5 | Phase 5 | Phase 2 | Phase 0 |
| 6 | Phase 6 | Phase 4 | Phase 0 |
| 7 | Phase 7 | Phase 4 | Phase 0 |

In Table 2, for high-speed '4' initial phase selection, samplers 1, 3, 5, 7 in FIG. 3 may be disabled, thereby saving power. Here, in a practical implementation, a phase select algorithm may be employed to map phase '1' to phase '0', map phase '3' to phase '2', map phase '5' to phase '4' and map phase '7' to phase '6', thereby simplifying the algorithm and allowing the sampling to be the same, independent of whether '4-phases' or '8-phases' are used to support high speed data.

TABLE 2

Low speed with four correlators

| DataPath | Initial Sample Phase | Intermediate Sample Phase | Final Sample Phase |
| --- | --- | --- | --- |
| 0 | Phase 0 | Phase 0 | Phase 0 |
| 1 | Phase 0 | Phase 0 | Phase 0 |
| 2 | Phase 2 | Phase 0 | Phase 0 |
| 3 | Phase 2 | Phase 0 | Phase 0 |
| 4 | Phase 4 | Phase 2 | Phase 0 |
| 5 | Phase 4 | Phase 2 | Phase 0 |
| 6 | Phase 6 | Phase 4 | Phase 0 |
| 7 | Phase 6 | Phase 4 | Phase 0 |

Table 3 illustrates one example of phases to support low speed data. In this manner, it is envisaged that '4' initial phase selection may be employed, with samplers 4, 5, 6, 7 from FIG. 3 being disabled. The disabling of the four top data paths (4, 5, 6, and 7) is controlled by speed mode control from, say, a control status register block 275 in FIG. 2. In one embodiment of the invention, such logic may be located within sampler logic 260. In practice, the first four sampler blocks (0, 1, 2, and 3) of the low speed 4-phase selection algorithm may be the same as the four samplers required for the high 8-phase speed.

TABLE 3

Low speed

| DataPath | Initial Sample Phase | Intermediate Sample Phase | Final Sample Phase |
| --- | --- | --- | --- |
| 0 | Phase 0 | Phase 0 | Phase 0 |
| 1 | Phase 1 | Phase 0 | Phase 0 |
| 2 | Phase 2 | Phase 0 | Phase 0 |
| 3 | Phase 3 | Phase 0 | Phase 0 |
| 4 | Disabled | Disabled | Disabled |
| 5 | Disabled | Disabled | Disabled |
| 6 | Disabled | Disabled | Disabled |
| 7 | Disabled | Disabled | Disabled |

Advantageously, once a particular data path is selected, e.g. indicated by phase 4, all other unused phases associated with the other particular data paths can be turned off, for example only phase '4', phase '2' and phase '0' are required to support continued sampling of high speed data for data path 4, as shown in Table 1 and Table 2. All the other data paths 0, 1, 2, 3, 5, 6, 7 can be disabled.

In another embodiment, out of a possible max '24' phases, only '3' phases are advantageously required once the data path is selected, as shown in Table 1. This can be achieved by ensuring each of the intermediate and final phases have separate phase enables, e.g. intermediate phase 0 for data path 0 has a different phase enable compared to intermediate phase 0 for data paths 1, 2 and 3. The same applies for the final phases, each of the final phases (even though they are the same clock phase) has a different phase enable. This allows only 3 out of a total of 24 phases to be enabled for the frame duration or until the end of frame or until the start of the next frame. For example, when data path 4 is selected for high speed with '8' initial phase, only the phases 4, 2 and 0 are enabled while all other 21 phases, including phases 4, 2 and 0 in other data paths, can be disabled, It is envisaged that in some embodiments of the invention, '4' initial phase selection may be used initially in circumstances where the received data is reliable, for example when the data jitter and clock jitter performance of the high-speed clock generators are acceptable, thereby saving on unnecessary power consumption within the sampling logic 260.

Although embodiments of the invention are described with respect to using '8' initial phase selection it is envisaged that the inventive concept may equally be utilised for any number of clock phases and for any combination of intermediate phases and subsequent selection of a final phase.

Thus, each sampler block in FIG. 3 is arranged to sample the incoming data with a different initial clock phase provided by the CCM 225 of FIG. 2, and re-sample the initially sampled data to an intermediate phase, before re-sampling the data to a single final phase, say phase '0' illustrated in the above Tables.

In this manner, the intermediate phase is used to ensure that the set up and hold components, such as flip-flops, registers, etc., between the initial phase and the final phase '0', have the correct data signal ready at the input of the sample and hold circuit when the correct clock phase trigger is applied to the component.

In some embodiments of the invention, the final phase may be advantageously selected such that all of the clock branches after the sampler are advantageously referenced to the same clock signal.

Therefore, and advantageously, the same architecture can be used for both high speed and low speed data with the other four unused data paths disabled for low speed operation.

Figure 4:
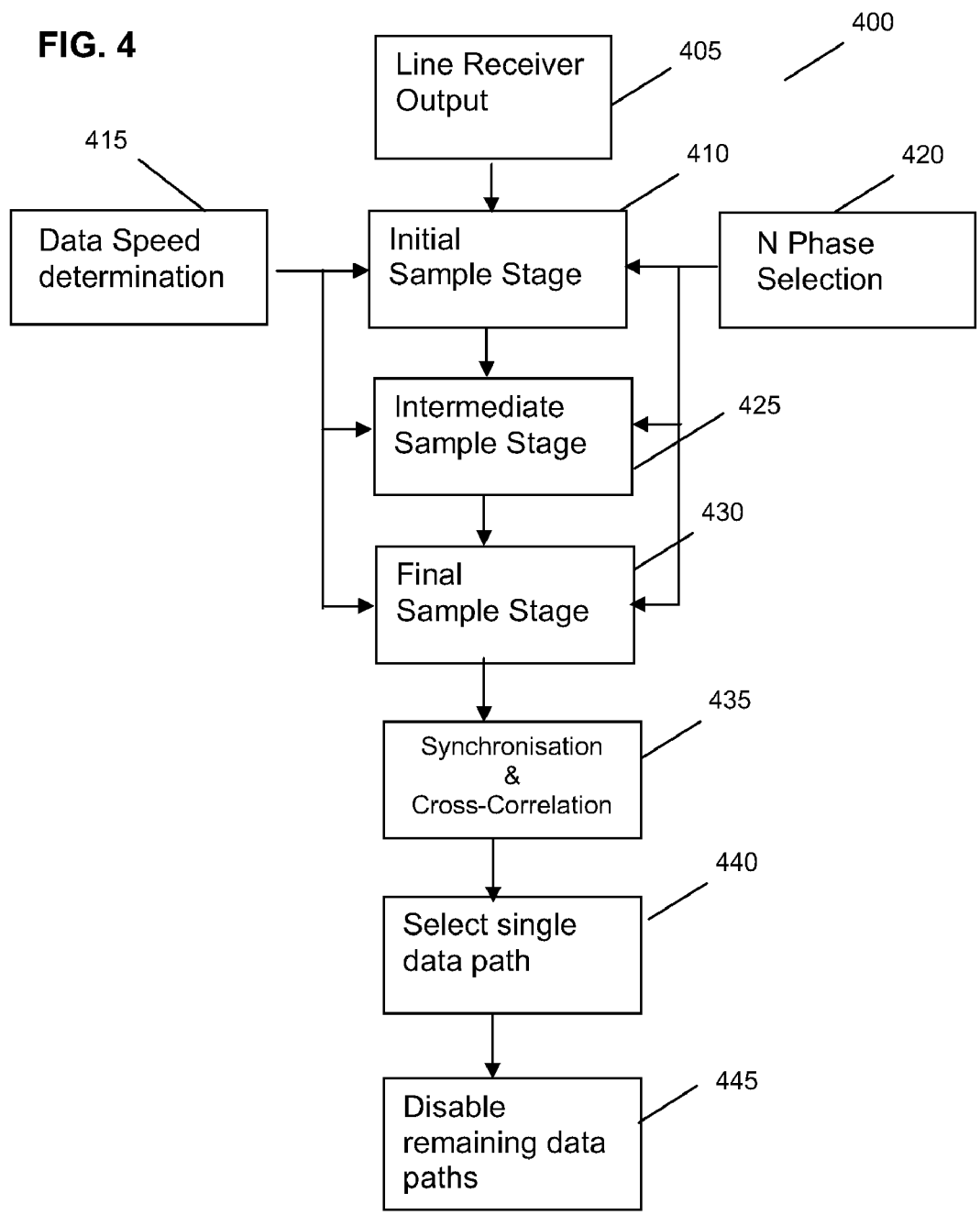
FIG. 4 illustrates a simplified flowchart of a method of sampling data in accordance with embodiments of the invention.

Referring now to FIG. 4, a simplified flowchart 400 illustrates a method of sampling data in accordance with embodiments of the invention. The flowchart commences in step 405 with the sampling logic receiving input data from the line receiver. The sampling logic performs three sampling operations dependent upon a determination of an input data speed identified in step 415 and employing multiple separated phases (N-phase) of a clock period of at least one clock signal, as shown in step 420. The three sampling operations comprise an initial sampling operation in step 410, a subsequent intermediate sampling operation in step 425 and a final sampling operation in step 430. The respective sampling operations are performed as described previously.

Figure 5:
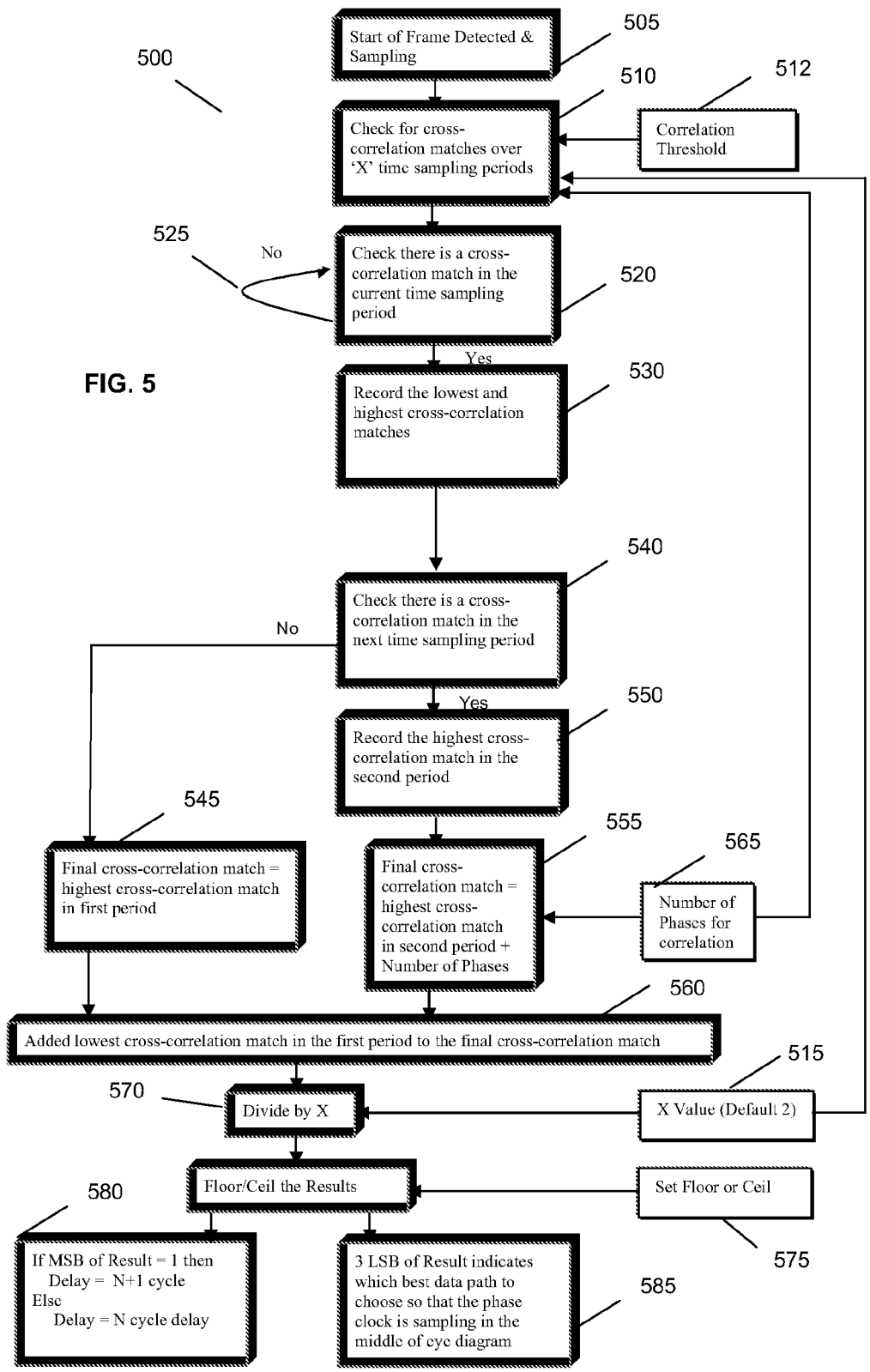
FIG. 5 illustrates a simplified flowchart of a method of cross-correlation in accordance with embodiments of the invention.
Figure 6:
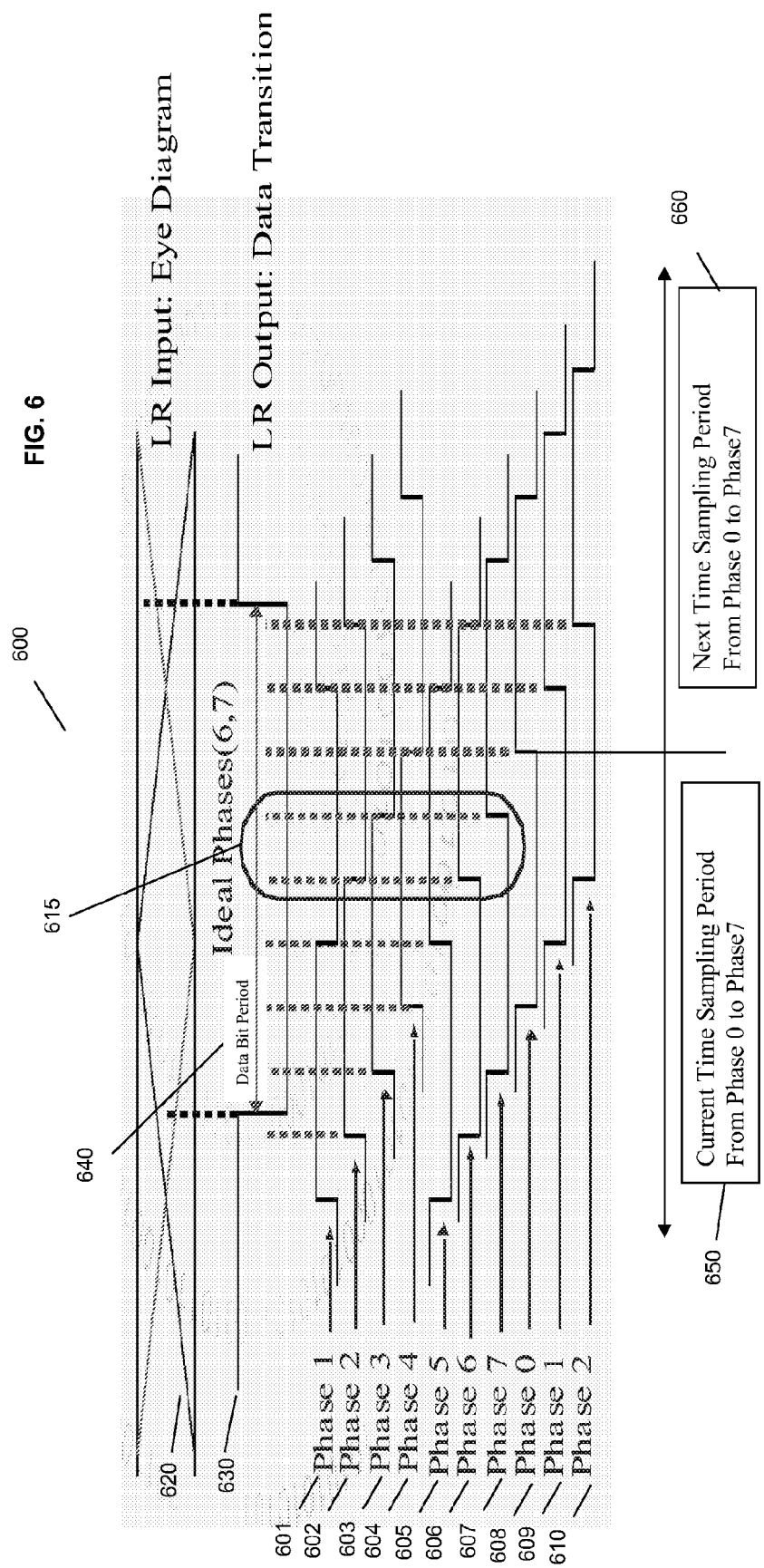
FIG. 6 illustrates a timing diagram of a method of cross-correlation in accordance with embodiments of the invention.

The flowchart continues in step 435 with a synchronisation operation and a cross-correlation operation, as described further with respect to FIG. 5 and FIG. 6. A single data path is selected based on the cross-correlation operation, as shown in step 440. In one embodiment of the invention, the remaining data paths may be disabled until the end of the current frame or start of the next frame in step 445, thereby supporting a power saving mode of operation.

FIG. 5 illustrates a simplified flowchart 500 of a method of cross-correlation in accordance with embodiments of the invention. The flowchart commences in step 505 with the detection of a start of a frame and sampling. A cross-correlation is performed to determine whether there is a match between the incoming data bits to the pre-determined bit pattern, as shown in step 510. In one embodiment of the invention, a cross-correlation threshold 512 is used to determine whether a sufficient match has been identified.

In one embodiment of the invention, the data paths achieving the required cross-correlation threshold are checked over two sampling time periods, where each sampling time period consists of the selected number of initial phases. For example, for '8' initial phase selection, each sampling time period is defined by initial phases 0, 1, 2, 3, 4, 5, 6 and 7, which are used to sample the incoming data.

To clarify the above and turning briefly to FIG. 6, the Line Receiver Output is sampled by the following initial phases: 3, 4, 5, 6, 7, 0, 1 and 2. Phases 3, 4, 5, 6, 7 are associated with the first sampling time period 650, whilst phases 0, 1 and 2 are associated with the second sampling period 660. This allows for multiple data paths to fulfil the cross-correlation requirements, which may occur during 'X' sampling time periods (as provided for in step 565 of FIG. 5) as the phases on the receiving end of the interface are not aligned to the phases on the transmitting end of the interface.

In this regard, a determination may be made in step 520 as to whether there is a data path that matches the cross-correlation threshold in the current time sampling period. If a determination is made in step 520 that there is no match in the current time sampling period, the process waits for the next time sampling period in step 525. If the determination in step 520 is that there is at least one data path cross-correlation match in the current time sampling period, a record is made of the lowest and highest data path number that meets the cross-correlation requirements, as shown in step 530. The algorithm then checks for cross-correlation in the next time sampling period in step 540.

In this embodiment the data paths are numbered 0 to 7, as shown in Table 1. The highest match is considered as being the largest data path number in the time sampling period that meets the cross-correlation threshold. The lowest match is considered as being the smallest data path number in the time sampling period that meets the cross-correlation threshold. For example, turning briefly to FIG. 6 again, the lowest match in the current time sampling period 650 could be phase '3' and the highest match could be phase '7' if they meet the cross-correlation threshold. In the following time sampling period 660, the lowest match may be phase '0' and the highest match may be phase '2'

Thereafter, a determination may be made in step 540 as to whether there is a match in the following (second) time sampling period. If a determination is made in step 540 that there is no match in the following (second bit) time sampling period, the process performs a final cross-correlation match, namely taking the highest cross-correlation data path match in the first time sampling period in step 545.

If the determination in step 540 is that there is a match in the following (second) time sampling period, a record is made of the highest cross-correlation data path match, as shown in step 550. The process then performs a final cross-correlation match, namely taking the highest cross-correlation match in the second time sampling period plus a number of selection phases, in step 555. In this regard, the number of phases for cross-correlation is input to the process in step 555.

Following on from step 545, or step 555, the lowest cross-correlation match is then added in from the first time sampling period to the final cross-correlation match, as shown in step 560. A "divide-by-X" operation is then performed in step 570, with, say, a default value of '2' for the 'X' input 565. The "divide-by-2" allows the result to be approximately in the middle range between the lowest and highest data path numbers recorded over two time-sampling periods as well as placing the sample in the middle of the data bit period. A high cap and a low cap are then placed on the results, in step 575.

In one embodiment of the invention, one option is available to 'floor' or 'ceiling' the result in step 575 if the divide-by-X operation results in a non-integer result. A floor function will round down the result and a lower data path number will be selected. A 'ceil' function will round up the result and a higher data path number will be selected. The algorithm benefits from a floor/ceil operation when the number of cross-correlation data path matches results in an even number.

If the most significant bit (MSB) of the result is a '1', then the process implements a delay of 'N+1' data bit periods. Otherwise, the process implements a delay of 'N' data bit delays, as shown in step 580. In this regard, a delay is equivalent to how many data bit periods it took to make the decision on a correct clock phase and perform a data path selection. Thus, the process determines how far along a chain of data-processing stages that the incoming data has proceeded. Furthermore, the three least significant bits (LSBs) 585 of the result indicates the best path to select (namely '1' out of a total number of data paths), so that the initial phase clock is sampling in the centre of the eye diagram, in step 585. The data path selected is the data path with an initial phase that is sampling the data in the middle of the data bit period.

In this manner, it can be seen that one aim of the cross-correlation and selection algorithm is to select the best phase for sampling during a synchronisation pattern search for each frame sent across the interface.

Referring now to FIG. 6, a timing diagram 600 illustrates the cross-correlation process in accordance with embodiments of the invention. The timing diagram 600 illustrates a Line Receive input eye diagram 620 and a series of data transitions output from the Line Receiver 630. The Line Receiver input eye diagram 620 illustrates a low-swing controlled-impedance differential signal on the input to the Line Receiver input 620.

The digital signal at the output of the Line Receiver 630 is sent to the data samplers and correlators. A series of eight clock-phase shifts 601, 602, 603, 604, 605, 606, 607, 608, are shown. These are the clock phases from the polyphase generator to the interface (initial phases for sampling the incoming data).

In particular, FIG. 6 illustrates how eight phases of the clock are used to sample the incoming data. Each phase is separated approximately by 45 degrees (e.g. 0.4 ns for high speed) for high speed '8' initial phase selection. The aim of the interface is to select one of the eight phases, such as phase-6 or phase-7, identified as reference 615, which is located in the middle of bit period at the output of the Line Receiver output transitions 630. This is equivalent to where the eye diagram is at its maximum to differentiate between a low sampled value and a high sampled value at the Line Receiver input 620. There is a delay from the Line Receiver Input to the Line Receiver Output, and hence the middle of the data bit period will not align exactly to the maximum eye opening seen on the Line Receiver Input.

The inventive concept hereinbefore described relates to re-sampling data of various clock phases. However, it is within the contemplation of the invention that variations of the re-sampling frequency (or multiples thereof) may still be used that fall within the tolerances of the required data rate performance.

In another embodiment of the invention, for low speed mode, it is envisaged that the polyphase generator or delay line circuit may be disabled. The required phases may be generated by the CCM by using a temperature controlled crystal oscillator (TCXO) or crystal oscillator (XTAL), which can be divided down to generate the required phases for low speed. For high speed modes it is also envisaged that the source of the clock phases may be either a polyphase generator or clock delay line. For medium and low speed modes, it is also envisaged that the source of the clock phases may be either and XTAL or TCXO.

It is further envisaged that the CCM may use the result of the cross-correlation and phase selection to clock gate unused phases and also de-assert 'enables' to the polyphase generator. Therefore, and advantageously, as much logic associated with the unused phases may be disabled, thereby reducing overall power consumption. In one embodiment of the invention, the results of the cross-correlation and phase selection may be used internal and external to the interface in order to reduce power.

Although embodiments of the invention are described with respect to a serial data interface, it is envisaged that the inventive concept applies equally to a parallel data interface. Thus, in such an embodiment, the inventive concept may support more than one TxData interface path from the BBIC to RFIC and/or more than one RxData interface path from the RFIC to BBIC, but where each path is a differential signalling voltage pair that carries asynchronous serial data across at different speeds.

Although the inventive concept is described with reference to differential signal voltages on the data interface, a skilled artisan will appreciate that other signalling types and data interfaces are able to utilise the inventive concept employed herein, such as a single-ended data interface. A skilled artisan will also appreciate that the clock source in the above embodiments, as well as the provision of sampling logic and cross-correlation logic, may also be sourced from the BB IC (or another sub-system) in contrast to the RFIC shown.

It will also be appreciated by a skilled artisan that although the above inventive concept has been described with reference to a BBIC-RFIC interface, the inventive concept is equally applicable to any data interface.

It is envisaged that the aforementioned inventive concept can be applied to most transceiver architectures and platform solutions, i.e. a semiconductor manufacturer may employ the inventive concepts in a design of a stand-alone RFIC and/or BBIC and/or any other sub-system element.

Thus, the inventive concept hereinbefore described aims to provide one or more of the following advantages over current wireless communication devices incorporating data interfaces:
 (i) The inventive concept utilises an intermediate sampling phase to meet the sample and hold requirements on a Dual-Mode 2.5G and 3G interface, substantially alleviating constraints with IC synthesis, timing analysis, power analysis and layout considerations.
 (ii) The inventive concept provides an improved implementation for phase sampling of high speed asynchronous data (say, at the Dual-Mode 2.5G and 3G interface standard 312 Mbps data rate) when using a high speed clock.
 (iii) The inventive concept allows sampling to be performed at either integer or a fractional multiple of the high speed data rate.
 (iv) The inventive concept allows for non-selected phases to be disabled, which is particularly advantageous when supporting high data transfer rates across the interface.
 (v) The provision of the final sampling phase embodiment allows for the interface to run multiple phases during synchronisation and sample and reference all the data, post synchronisation, using only one high speed phase clock.
 (vi) The provision of the final sampling phase embodiment allows for easier clock tree distribution for all blocks in the interface after the sampler logic.
 (vii) The provision of a simplified clock tree design makes it easier to achieve acceptable set up and hold times and automatic placement and route (APR) of components when designing an IC layout.
 (viii) The provision of the phase sampling technique assists the reduction of the design cost and area, thereby allowing for easier design flow implementation for the interface block and IC.
 (ix) The provision the phase sampling technique assists the reduction in digital power & gate area at a high data and clocking rate.

In the aforementioned description, it is envisaged that a skilled person would readily understand that any reference to a particular frequency of operation encompasses the particular frequency as well as any margin or tolerance associated with any components associated with generating, routing or processing the frequency. For example, it is envisaged that any reference to any frequency hereinbefore mentioned encompasses that frequency with a tolerance of, say, ±20%.

In particular, it is envisaged that the aforementioned inventive concept can be applied by a semiconductor manufacturer to any integrated circuit architecture supporting the routing of data across an interface. It is further envisaged that, for example, a semiconductor manufacturer may employ the inventive concept in a design of a stand-alone device, or application-specific integrated circuit (ASIC) and/or any other sub-system element employing an integrated circuit to support routing of data across an interface.

It will be appreciated that any suitable distribution of functionality between different functional units or controllers or memory elements, may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, a means of incorporating a data interface between integrated circuits (or sub-systems) in an electronic device has been described, where the aforementioned disadvantages with prior art arrangements have been substantially alleviated.

The invention claimed is:

1. An electronic device comprises:
a number of sub-systems and clock generation logic arranged to generate at least one clock signal to be applied to the number of sub-systems, wherein one of the number of sub-systems comprises sampling logic for receiving input data and performing initial sampling on an input data bit using multiple separated phases of a clock period of the at least one clock signal applied to the sampling logic thereby producing multiple phase separated sampled outputs of the input data bit;
wherein the sampling logic comprises a plurality of data paths, each of the plurality of data paths to perform a resampling operation on a corresponding one of the multiple phase separated sampled outputs to produce a corresponding intermediate sampled outputs prior to performing a final sample of the corresponding intermediate sampled output at a single phase of the at least one clock signal to produce a corresponding sampled input data signal; and
a cross-correlator to select a clock phase based on sampled input data signals provided by the plurality of data paths and to disable a subset of the plurality of data paths based on the selected clock phase.

2. An integrated circuit comprising:
at least one of a number of sub-systems and arranged to comprise or be operably coupled to clock generation logic arranged to generate at least one clock signal, wherein the integrated circuit comprises sampling logic for receiving input data and performing initial sampling on an input data bit using multiple separated phases of the at least one clock signal applied to the sampling logic thereby producing multiple phase separated sampled outputs of the input data bit;
wherein the sampling logic comprises a plurality of data paths, each of the plurality of data paths to perform a resampling operation on a corresponding one of the multiple phase separated sampled outputs to produce a corresponding intermediate sampled output prior to performing a final sample of the corresponding intermediate sampled output at a single phase of the at least one clock signal to produce a corresponding sampled input data signal; and
a cross-correlator to select a clock phase based on sampled input data signals provided by the plurality of data paths and to disable a subset of the plurality of data paths based on the selected clock phase.

3. The integrated circuit of claim 2 wherein the integrated circuit is a radio frequency integrated circuit or a baseband integrated circuit.

4. The integrated circuit of claim 2 wherein the cross-correlator comprises programmable logic, and the cross-correlator is arranged to select a the clock phase to be used by the sampling logic in sampling the input data, such that the programmable logic is arranged to program a final sample at a single phase of the at least one clock signal.

5. The integrated circuit of claim 4 wherein the programmable logic is arranged to program the final sample at a single phase of the at least one clock signal so that a maximum time is allowed between the initial phase and intermediate phase and/or the intermediate phase and final sampling phase.

6. The integrated circuit of claim 2 wherein the input data is received using one of a plurality of data rates and the sampling logic is arranged to sample input data at either the initial sampling and/or intermediate sampling at multiple sampling phases.

7. The integrated circuit of claim 6 wherein the multiple sampling phases are selected dependent upon one or more of the following:
(i) The input data rate;
(ii) A performance of the at least one clock signal; and
(iii) A performance of the input data signal.

8. The integrated circuit of claim 7 wherein:
(i) The performance of the at least one clock signal is clock jitter; and
(ii) The performance of the input data signal is data jitter.

9. The integrated circuit of claim 6 wherein the subset of data paths comprises a first set when the input data rate is at a first data rate of the number of data rates and comprises a second set when the input data rate is at a second data rate.

10. The integrated circuit of claim 2 wherein the subset of data paths are disabled for a duration of a current frame or until a subsequent frame is received.

11. The integrated circuit of claim 2 further comprising a clock control module operably coupled to the clock generation logic and in response to performing a final sample at a single phase of the at least one clock signal to produce a sampled input data signal, selected functionality of the clock control module is disabled.

12. The integrated circuit of claim 2 wherein the clock generation logic arranged to generate at least one clock signal comprises a polyphase generator or one or more delay lines.

13. The integrated circuit of claim 2 wherein the multiple phase separated sampled outputs comprises a plurality of selected initial phases associated with a selected sampling speed.

14. The integrated circuit of claim 13 wherein the plurality of selected initial phases comprises 8-phases, 4-phases or 2-phases.

15. The integrated circuit of claim 2 wherein the integrated circuit is arranged to support third generation or fourth generation communication.

16. A method of sampling data in an electronic device, the method comprises:
receiving input data comprising an input data bit;
performing initial sampling on the input data bit at a plurality of data paths using multiple separated phases of a clock period of at least one clock signal;
producing at the plurality of data paths multiple phase-separated sampled outputs of the input data bit;
performing at the plurality of data paths a number of re-sampling operations on the multiple phase-separated sampled outputs at a number of intermediate phases;

producing at the plurality of data paths multiple phase separated intermediate sampled outputs;

performing a final sample of the multiple phase separated intermediate sampled outputs at a single phase of the at least one clock signal to produce a sampled input data signal;

selecting a clock phase based on the final sample; and disabling a subset of the plurality of data paths based on the selected clock phase.

17. The method of claim 16 further comprising programming the final sample at the selected clock phase.

18. The integrated circuit of claim 3 wherein the input data is received using one of a plurality of data rates and the sampling logic is arranged to sample input data at either the initial sampling and/or intermediate sampling at multiple sampling phases.

* * * * *